H. H. LYON.
ELECTRICAL MEASURING INSTRUMENT.
APPLICATION FILED DEC. 1, 1916.

1,292,496.

Patented Jan. 28, 1919.
2 SHEETS—SHEET 2.

WITNESSES:

INVENTOR
Henry H. Lyon.
BY
ATTORNEY

UNITED STATES PATENT OFFICE.

HENRY H. LYON, OF BUFFALO, NEW YORK.

ELECTRICAL MEASURING INSTRUMENT.

1,292,496. Specification of Letters Patent. Patented Jan. 28, 1919.

Application filed December 1, 1916. Serial No. 134,295.

*To all whom it may concern:*

Be it known that I, HENRY H. LYON, a citizen of the United States, and a resident of Buffalo, in the county of Erie and State of New York, have invented a new and useful Improvement in Electrical Measuring Instruments, of which the following is a specification.

My invention relates to electrical measuring instruments and particularly to recording watt and volt-ampere meters.

The object of my invention is to provide a meter of the above indicated character that shall be simple to construct and efficient in its operation.

Figure 1:
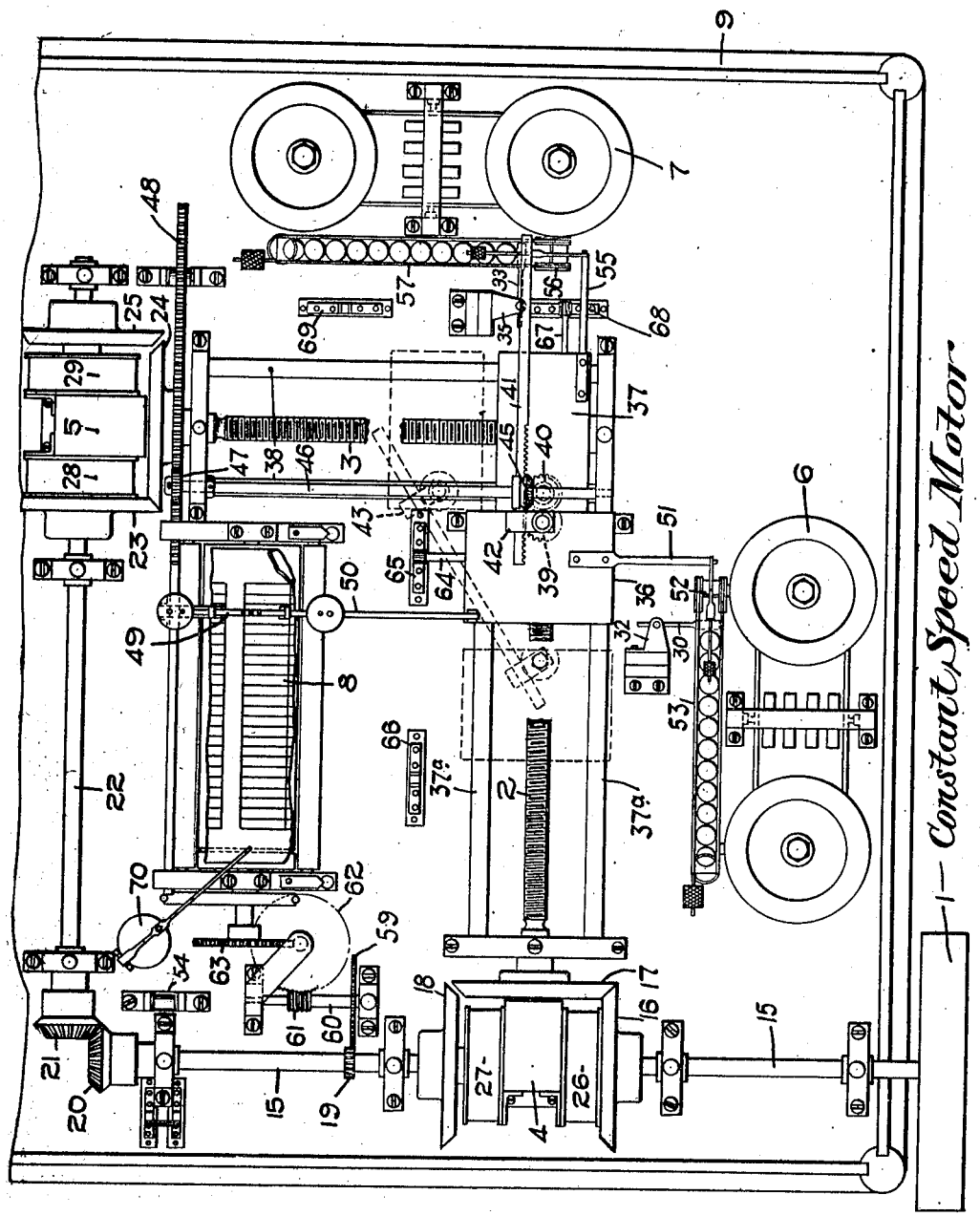
Figure 3:
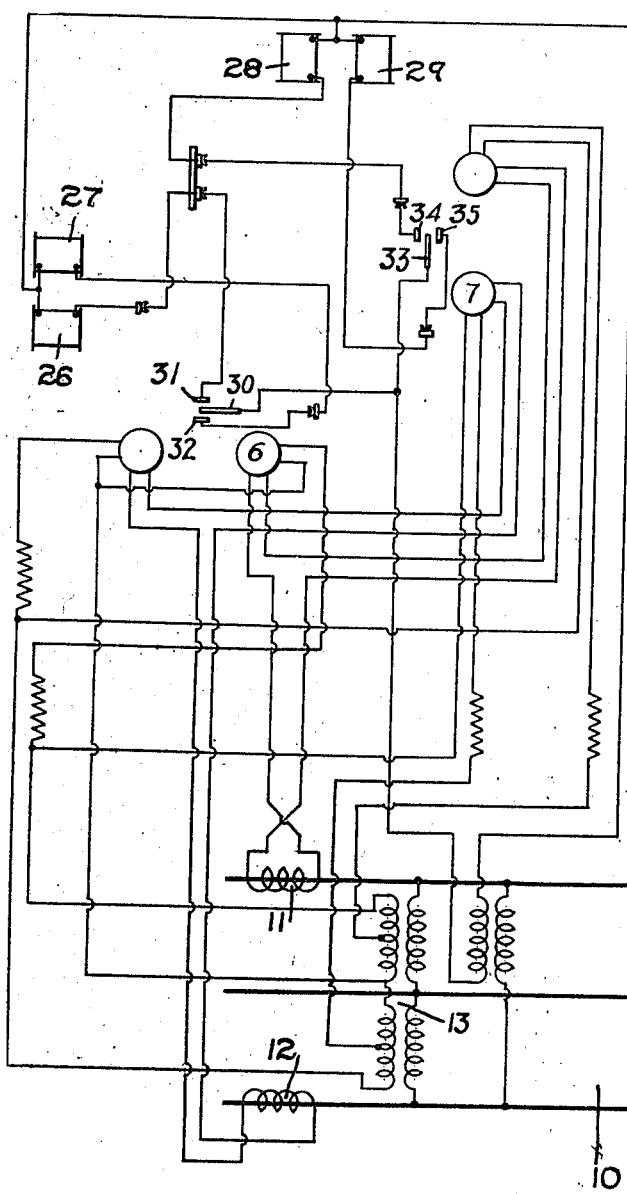
Figure 2:
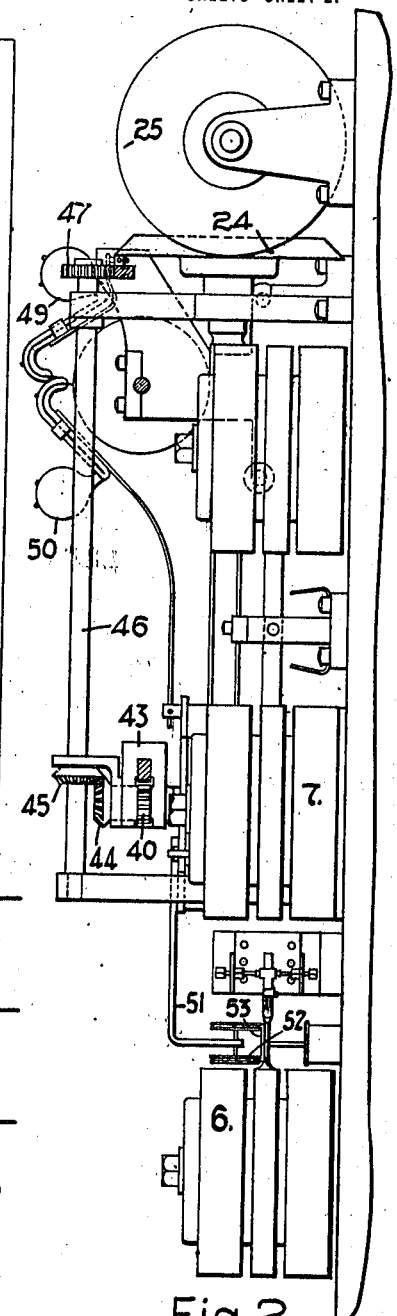

Figure 1 of the accompanying drawings is a plan view of a meter embodying my invention; Fig. 2 is a side elevational view of the meter shown in Fig. 1, and Fig. 3 is a diagrammatic view of the connections of the instrument shown in Figs. 1 and 2.

My invention comprises, in general, a driving member 1, two driven worm-screw shafts or members 2 and 3, clutching devices 4 and 5 for operatively connecting the members 2 and 3 to the driving member, a watt meter 6, a reactive-component meter 7 and a record sheet 8, all of which are disposed in an inclosing casing 9.

The meters 6 and 7 are of the Kelvin-balance type and are so connected to the circuit 10, the volt-amperes and the true power of which is to be determined, through transformers 11, 12 and 13, as to be actuated in accordance with the true watts and the reactive component of the power traversing the circuit 10, respectively. That is, the voltage windings of the meter 7 are so connected to the circuit 10 that the currents which traverse the same are substantially 90 degrees out of phase with the currents traversing the voltage windings of the meter 6.

The driving member 1, which may be a clock mechanism or a substantially constant-speed electric motor, is adapted to actuate a shaft 15 upon which a bevel disk 16 is mounted. The disk 16 is adapted to frictionally engage a bevel disk 17 that is mounted at one end of the screw shaft 2, and the disk 17 is adapted also to engage a bevel disk 18 that is also mounted on the shaft 15 upon which a pinion 19 is also mounted. The shaft 15 is provided also with a bevel gear wheel 20 that is adapted to engage a bevel gear wheel 21 on a shaft 22. The shafts 15 and 22 are relatively movable longitudinally with respect to the gear wheels 20 and 21. A bevel disk 23 is mounted on the shaft 22 and is adapted to engage a bevel disk 24 that is mounted at one end of the screw shaft 3. The bevel disk 24 is also adapted to engage a bevel disk 25 that is also mounted on the shaft 22.

The clutching devices 4 and 5 are provided with electromagnet windings 26 and 27 and 28 and 29, respectively, for the purpose of effecting the engagement and disengagement of the bevel disks 17 and 24 with the bevel disks 16 and 18 and 23 and 25, respectively. Thus, when the bevel disk 16 engages the bevel disk 17, the shaft 2 will be turned in one direction and when the bevel disk 17 is engaged by the bevel disk 18, the shaft 2 will be turned in the other direction. Similarly, when the bevel disk 24 is engaged by the bevel disks 23 and 25, the shaft 3 will be turned in the one or the other direction according to which of the electromagnet windings 28 and 29 is energized.

The meter 6 is provided with a movable-contact member 30 and stationary-contact members 31 and 32 for the purpose of controlling the energization of the magnets 26 and 27. Similarly, the meter 7 is provided with a movable-contact member 33 and stationary-contact members 34 and 35 that are adapted to control the circuits of the electromagnet windings 28 and 29.

A carriage 36 is mounted upon rails 37ª and so operatively connected to the shaft 2 that, when the shaft 2 turns, the carriage 36 will be moved in the one or the other direction in accordance with the direction of rotation of the shaft. A similar carriage 37 is mounted on rails 38 and so operatively connected to the shaft 3 that it will move in the one or the other direction in accordance with the direction of rotation of the shaft 3. The shafts 2 and 3 are disposed substantially at right angles with respect to each other and, since the shaft 2 is controlled in its operation by a watt meter and the shaft 3 is controlled in its operation by a reactive-component meter, the carriages 36 and 37 will be actuated in accordance with the true watts and the reactive component of the power traversing the circuit 10, respectively. Thus, if some means is provided for determining the hypotenuse of the triangle represented by the movement of the carriages 36 and 37, an indication of the apparent watts traversing the circuit 10 may be obtained.

A non-rotatable pinion 39 's mounted on the carriage 36, and a freely-rotatable pinion 40 is mounted on the carriage 37. A toothed rack 41 is held in engagement with the pinions 39 and 40 by guiding members 42 and 43, respectively. The pinion 40 is operatively connected to a bevel gear wheel 44 that is adapted to engage a bevel gear wheel 45 which is slidably mounted on a polygonal shaft 46 upon which is also mounted a pinion 47. The pinion 47 is adapted to engage a toothed rack 48 upon which is mounted a marking device 49. A similar marking device 50 is mounted on the carriage 36. A projection 51 is mounted on the carriage 36 and is provided with rollers 52 that are adapted to engage a channel or trough member 53 which is operatively connected to the meter 6. Thus, when the meter 6 operates, the rollers 52 will be caused to run to the one or the other end of the trough 53 to balance the torque of the same. Similarly, the carriage 37 is provided with a projection 55 upon which rollers 56 are mounted that are adapted to engage a channel member 57. The rollers 56 are adapted to move to the one or the other end of the channel 57 in accordance with the movement of the meter 7. Thus, the movement of the carriage 37 will balance the torque of the meter 7 to cause its contact member 33 to assume its normal or mid position periodically.

The pinion 19 that is mounted upon the shaft 15 is adapted to engage a gear wheel 59 that is mounted upon a shaft 60 upon which is also mounted a worm screw 61. The worm screw 61 is adapted to engage a worm wheel 62 which, through gearing 63, is adapted to continuously actuate the record sheet 8.

When the carriages 36 and 37 move to the positions shown in the broken lines of Fig. 1 of the drawings, the pinion 40 will be rotated by two forces transmitted through the rack 41 that are caused by the movement of the carriage 36 and by the movement of the carriage 37. In other words, the pinion 40 will be turned an amount proportional to the distance between the centers of the pinions 39 and 40. Since this distance is proportional to the resultant of the true watts and the reactive component of the power tranversing the circuit 10, it is an indication of the apparent power traversing the circuit 10. Since the bevel gear wheel 45 is slidable upon the shaft 46 and since it is maintained in engagement with the bevel gear 44 under all conditions, the shaft 46 and, consequently, the pinion 47, the rack 48 and the marking device 49 will be actuated in accordance with the apparent power traversing the circuit 10 to record the same upon the record sheet 8. Since the carriage 36 is actuated in accordance with the true power traversing the circuit 10, the marking device 50 will record, upon the record sheet 8, a record of the true power traversing the circuit 10.

The carriage 36 is provided with a member 64 that is adapted to actuate circuit interrupters 65 and 66 for the purpose of controlling the circuits of the electromagnet windings 26 and 27 to thereby limit the movement of the carriage 36. Similarly, the carriage 37 is provided with a member 67 that is adapted to actuate circuit interrupters 68 and 69 for the purpose of limiting the movements of the carriage 37. A circuit interrupter 54 is adapted to be opened when the rack 48 has moved a predetermined distance to thereby deënergize the electromagnet windings 26 and 28, and thus prevent the overtravel of the marking device 49.

A punch device 70 is provided for periodically engaging the record sheet 8 for the purpose of indicating the rate of movement of the same and thus affords an accurate indication of the time of the records produced thereon.

I do not limit my invention to the particular structure illustrated, as it may be variously modified without departing from the spirit and scope of the same as set forth in the appended claims.

I claim as my invention:

1. The combination with a carriage adapted to be actuated in accordance with the true watts traversing a circuit to be measured, and a carriage adapted to be actuated in accordance with the reactive component of the power traversing the circuit, of a non-rotatable pinion mounted on one of the carriages, a rotatable pinion mounted on the other carriage, a toothed rack for engaging the said pinions, and means for indicating the movement of the rotatable pinion.

2. The combination with two reciprocating members disposed substantially at right angles with respect to each other, of a non-rotatable pinion mounted on one of the members, a rotatable pinion mounted on the other, a toothed rack for operatively connecting the pinions together, and means actuated by the rotatable pinion.

3. The combination with two reciprocating members disposed substantially at right angles with respect to each other, of a non-rotatable pinion mounted on one of the members, a rotatable pinion mounted on the other, a toothed rack for operatively connecting the pinions together, and means for indicating the distance between the said pinions under all conditions.

4. In an apparent-power measuring instrument, the combination with two screw shafts disposed substantially at right angles with respect to each other, and means for controlling the operation of one of the shafts in accordance with the true-watts component of the power traversing a circuit to be measured and the other in accordance with the reactive component of the watts traversing the circuit, of members adapted to be actuated by the screw shafts, a rack member operatively connecting the members together and adapted to actuate an indicating device in accordance with the resultant of the two components of the power traversing the circuit.

5. In apparent-power meter, the combination with a driving member, two driven members disposed substantially at right angles with respect to each other, and means for controlling the operation of the driven members in accordance with two components of the apparent power traversing a circuit, of a non-rotatable pinion mounted on one of the driven members, a freely rotatable pinion mounted on the other driven member, a rack for engaging the said pinions, and indicating means actuated by the rotatable pinion.

6. In an electrical measuring instrument, the combination with a driving member, two driven members disposed at substantially right angles with respect to each other, clutching devices for connecting the driven members to the driving members, and means for controlling the clutching devices, of a rotatable pinion mounted on one of the driven members, a rack operatively connected to the other driven member and adapted to engage the pinion, and a marking means actuated in accordance with the movement of the said pinion.

7. The combination with two reciprocating members disposed substantially at right angles with respect to each other, of a rotatable pinion mounted on one of the movable members, a rack pivotally mounted, at one of its ends, on the other member and adapted to engage the pinion, and means for indicating the movement of the said pinion.

8. The combination with two reciprocating members disposed substantially at right angles to each other, of a rotatable pinion mounted on one of the movable members, a rack pivotally mounted, at one of its ends, on the other member and adapted to engage the pinion, a polygonal shaft, a gear wheel slidably mounted thereon, means whereby the said pinion actuates the said shaft through the gear wheel, and means whereby the shaft actuates a marking device.

9. The combination with two reciprocating members disposed substantially at right angles with respect to each other, of a rotatable pinion mounted on one of the movable members, a rack operatively connected to one of the movable members and adapted to engage the pinion, and a marking device adapted to be actuated by the said pinion.

10. In a measuring instrument, the combination with a driving member, two driven members disposed at right angles to each other, clutching devices for operatively connecting the driving members to the driven members, and means for controlling the clutching devices, of a freely rotatable pinion mounted on one of the driven members, a rack operatively connected, at one of its ends, to the other driven member and adapted to engage the pinion, a record sheet adapted to be advanced by the driving member, and a marking device for the record sheet adapted to be driven by the said pinion.

11. The combination with a driving member, two reciprocating members, a clutching device for operatively connecting the reciprocating members to the driving member, a watt meter for controlling one clutching device and a reactive-component meter for controlling the other clutching device, of means mounted on one of the reciprocating members adapted to be actuated in accordance with the movement of the said reciprocating member, and means for indicating the movement of the said means.

In testimony whereof I have hereunto subscribed my name this 27th day of November, 1916.

HENRY H. LYON.